United States Patent
Myles et al.

(10) Patent No.: US 7,197,297 B2
(45) Date of Patent: Mar. 27, 2007

(54) AUTHENTICATION METHOD FOR ENABLING A USER OF A MOBILE STATION TO ACCESS TO PRIVATE DATA OR SERVICES

(75) Inventors: Colin Myles, Duxford (GB); Richard Owen, Impington (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 236 days.

(21) Appl. No.: 10/782,224

(22) Filed: Feb. 19, 2004

(65) Prior Publication Data

US 2004/0209597 A1 Oct. 21, 2004

(30) Foreign Application Priority Data

Feb. 21, 2003 (GB) ................. 0304060.7

(51) Int. Cl.
*H04M 1/66* (2006.01)
(52) U.S. Cl. ........... 455/411; 455/412.1; 455/412.2; 455/414.1; 455/466
(58) Field of Classification Search ............. 455/411, 455/410, 412.1–413, 466, 418, 517, 414.1, 455/414.2, 415, 566; 713/169, 170
See application file for complete search history.

(56) References Cited

U.S. PATENT DOCUMENTS

| | | | |
|---|---|---|---|
| 6,292,833 B1 * | 9/2001 | Liao et al. | 709/229 |
| 2002/0087892 A1 * | 7/2002 | Imazu | 713/202 |
| 2003/0017822 A1 * | 1/2003 | Kissner et al. | 455/411 |
| 2004/0076128 A1 * | 4/2004 | Rao et al. | 370/328 |
| 2004/0148400 A1 * | 7/2004 | Mostafa | 709/227 |
| 2004/0152446 A1 * | 8/2004 | Saunders et al. | 455/411 |
| 2005/0120209 A1 * | 6/2005 | Kwon et al. | 713/161 |
| 2005/0176409 A1 * | 8/2005 | Carpenter | 455/412.1 |

FOREIGN PATENT DOCUMENTS

| | | |
|---|---|---|
| EP | 1 102 157 A1 | 5/2001 |
| JP | 11-27750 A | 1/1999 |
| JP | 2001-144865 A | 5/2001 |
| JP | 2002-55955 A | 2/2002 |
| JP | 2002-189952 A | 7/2002 |
| JP | 2002-259254 A | 9/2002 |
| JP | 2002-291046 A | 10/2002 |

\* cited by examiner

*Primary Examiner*—Duc M. Nguyen
*Assistant Examiner*—Dai Phuong
(74) *Attorney, Agent, or Firm*—Steven Gahlings; Jody Lynn DeStefanis; Dale Gaudier

(57) ABSTRACT

A method for accessing private data/services from a mobile station over a public network is described including: composing a text-based request message on the mobile station, sending the request message to a private server offering access to private data/services, and checking the authenticity of the user based on the request message received by the server. If user authenticity is confirmed, a text-based response message is composed and sent to the mobile station. The request message includes a user-unique identifier received by the private server with an appended user mobile station number. Authenticity checking (by the private server) includes checking whether (1) the user-unique identifier is stored in a private directory database, and (2) the appended user mobile station number matches the number allocated to the user-unique identifier stored in the private directory database. The interaction is limited to the exchange of pairs of text-based request message(s) and response(s).

11 Claims, 2 Drawing Sheets

AUTHENTICATION METHOD FOR ENABLING A USER OF A MOBILE STATION TO ACCESS TO PRIVATE DATA OR SERVICES

The present invention claims priority to co-pending Great Britain Patent Application No. 0304060.7 filed 21 Feb. 2003, incorporated by reference herein in its entirety.

FIELD OF THE INVENTION

The invention relates to a method for authenticating a user of a mobile station for accessing to private data or services, and more particularly to a text-message based authentication method.

BACKGROUND OF THE INVENTION

A user of a mobile station, such as a mobile phone, a feature phone, or an evolved laptop computer or a personal digital assistant (pda) having communication capabilities (compliant with GSM, CDMA, 2.5G, 3G, UMTS . . . etc networks), or a smart-device (i.e. a combination of pda and mobile phone) enables its user to have access to remote source of data or services.

As an example described in WO 02/076122, it is possible for a user of a mobile station to have access to a telephone directory service. Typically, the user place a call to a specific number and request a phone number. The requested phone number is received via a short message services (SMS) and can be further stored in the mobile station for later use. In such a system, the user selects the requested information by either accessing a web interface or indirectly through an operator.

This access to the information is quite complicated and do not offer sufficient security, in particular when an access to private data or services is required.

OBJECT AND SUMMARY OF THE INVENTION

Therefore it is an object of the present invention to provide a method and system that overcomes the at least one shortcoming of the prior art system.

The present invention provides a method for accessing private data or services over a public network including the step of authenticating a user of a mobile station (MS) for accessing to private data/services (D, S), comprising the steps of:

composing a text-based request message on the mobile station using a standard public text messaging protocol, said message including a request for private data (SP), and sending said request message to a private server (MG, PS) offering the access to said private data/services (D, S), via the telephone network (N), checking the authenticity of the user based on the request message received by the server (MG, PS), if the user authenticity is confirmed, composing a text based response message using a standard public text messaging protocol, the response message including the requested private data/services (D, S) of the private server, and sending back to the user said text based response message, via the telephone network (N), wherein the request message additionally includes a user unique identifier (AP), and is received by the private server with an appended user mobile station number, wherein the authenticity checking performed by the private server comprises the steps of:

checking whether the user unique identifier (AP) is stored in a private directory database (DB), and checking whether the appended user mobile station number matches with the user mobile station number allocated to the user unique identifier stored in the private directory database (DB);

and wherein the interaction between the private server and the mobile station is limited to the exchange of the text-based request message and the text based response and further interaction between the private server and the mobile station require the sending of a new request message.

From the mobile station user perspective, the security is improved because the user knows to which private server number he has to send the request message, and he knows his own user unique identifier to be included in the request message. Security can be additionally enhanced if these data are not stored in the mobile station.

From the private data or service provider, the security is improved because authorized mobile station user are listed in the private directory database of the corporation or organization, and two particular fields (i.e. the user mobile station number and the user unique identifier) are checked for authentication. Additionally, the response message is sent back to the originating mobile station number requesting the data/service. Security can be further enhanced if the request and response message are encrypted, particularly when routed on the telecommunication network.

It is understood that such private data or services can be, as an example, corporate data or corporate services offered by a company to selected employees. Corporate data can be data of a corporate directory such as lightweight directory access protocol (ldap) database (also called ldap directory). Such a database offers professional and/or personal data about employees of a corporation, or known or authorized persons of an organization. Such data can be name, employee number, employee unique identifier, alias, e-mail address, phone number, location, office number, personal picture, function, . . . etc. Corporate service can be for example technical data service, like providing an access to real-time data related to the corporate operations, e.g. providing measurement given by a remote sensor.

The message based authentication method of the invention provides a reasonable first-level identification and authorization of a mobile station user for accessing to private data or services which do not need a strong or high-level of security.

Also, the method is simple and easy to use for any kind of mobile station that supports SMS (short message services), EMS (enhanced message services) or MMS (multimedia message services) type message. Today SMS message and in a close future EMS and MMS message are/will be available for users outside their home networks when roaming on visited networks. Thus, the authentication mechanism based on standard text message can use the worldwide available mobile phone infrastructures and services.

Another advantage is that the method of the invention works independently of the mobile station identification and authentication of the network operators. Therefore, this method can be implemented smoothly without interfering in the phone network operation.

Other characteristics and advantages of the invention will be described in more detailed in the following description of the invention and in one practical example of application.

BRIEF DESCRIPTION OF THE DRAWINGS

The following detailed description, given by way of example, will be best understood with the accompanying drawings in which.

DETAILED DESCRIPTION OF THE INVENTION

Figure 1:
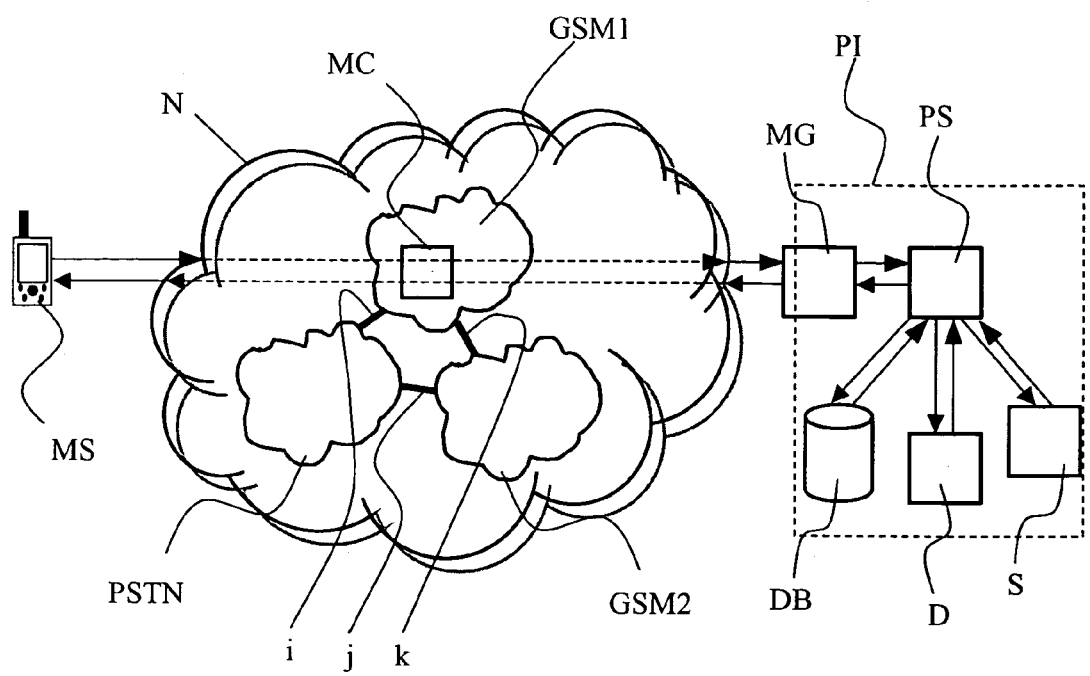
FIG. 1 represents schematically a system for implementing the authentication method of the invention.
Figure 2:
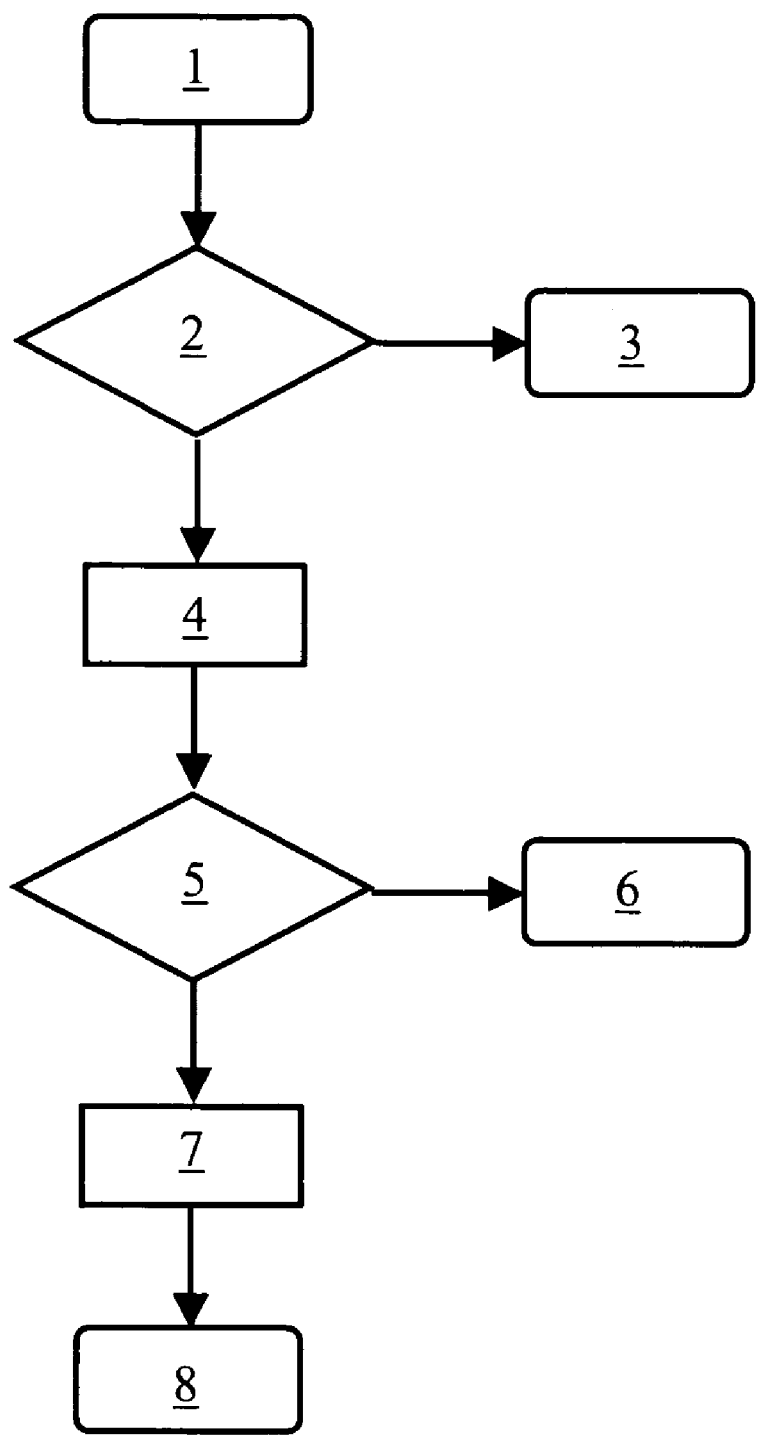
FIG. 2 shows a flowchart representing the different steps of the authentication method of the invention.

FIG. 1 illustrates schematically the different elements of a system and their interaction for implementing the authentication method of the invention. This figure will be described in combination with FIG. 2 which represents the different steps of said authentication method.

In a first step 1, the user of mobile station MS compose a request message on his mobile station. This request message can be formatted as a SMS, EMS or MMS type message and is written with a specific layout.

The request message comprises an authentication part and a data or service request part. Advantageously, the authentication part comprises a unique identifier of the mobile station user. The specific layout will be presented in more details with the description related to FIG. 3 below.

The request message is sent to a specific telephone number corresponding to the messaging gateway MG. The request message is routed across the telephone network N to the messaging gateway MG. The telephone network architecture, functionality and way of routing calls or message are well know by the man skilled in the art and therefore will not be further detailed. It is well known that the telephone network N can comprise, while not being limited to, a first mobile phone network GSM1 of a first mobile telecommunication operator covering a first area, a second mobile phone network GSM2 of a second mobile telecommunication operator covering a second area, and a public switched telecommunication network PSTN of fixed telecommunication operator. Said network N comprises at least one messaging center MC dedicated to manage and route SMS, or EMS, or MMS type message. Obviously, the structure, number of sub-networks and inter-connection can be more complex than what is shown on FIG. 1. Each of these local networks are inter-connected to each other to provide local, regional, national and international communication to any user of mobile station having subscribe to roaming capability outside its telecommunication operator home network.

The messaging gateway MG will receive the request message. The messaging gateway is an interface between the network N and a private infrastructure PI. The private infrastructure PI comprises all the resources (internal network, server, computer, databases . . . etc) of e.g. a corporation or an organization. The private infrastructure PI shown in FIG. 1 comprises a processing server PS, a corporate directory database DB, a database or an equipment (e.g. a sensor) providing data D and a service node S. All other elements of this private infrastructure are omitted for sake of drawing clarity.

In a second step 2, the received request message is routed by the messaging gateway to the processing server PS. The server separates the authentication part, the data or service request part, and the originating mobile station phone number from the request message. It is to be noted that originating mobile station phone number is tagged to the incoming message as indicated in ETSI standard TS 100 901 related to Technical realization of the Short Message Service (SMS) (GSM 03.40 version 7.4.0 Release 1998). Then the server check whether the user unique identifier of the authentication part is present on the private directory database DB.

Here, the processing server PS has two functions, one is to process the message and the other is to authenticate the message. As an alternative (not shown on Figures), it is possible to have a message processing server and a distinct authentication server. In this case, the message processing server role is only to separate the authentication part, the data or service request part, and the originating mobile station phone number from the request message, while the authentication server only performs a look-up request on the private directory database DB.

If the user unique identifier is not present in the private directory database DB, then an error sequence is generated by the processing server PS (step 3) and access to private data or services is denied. In this case, either a error response message is sent back to the mobile station, or alternatively not any response message is sent back to the mobile station in order to avoid possible unauthorized access through probing.

In case, the user unique identifier of the authentication part is present on the private directory database DB, the user mobile station number assigned to the user unique identifier and stored in the private directory database DB is retrieved from the database DB by the processing server PS (step 4) or alternatively by the authentication server.

This mobile station user number is recognized as being known and authorized to communicate with the corporation or the organization.

After this successful private directory look-up, a second checking is performed (step 5). This second check consists in comparing the user mobile station number attached to the request message with the user mobile station number assigned to the user unique identifier and stored in the private directory database DB.

It is to be noted that the user mobile station number is the cell-phone, mobile phone, feature phone or a smart-device number that is allocated and stored on the originating mobile station and allocated to this particular user in the ldap directory. As an example, this number is the assigned phone number of the SIM-card (SIM stands for Subscriber Identity Module) present in the mobile station for authorizing access to the telecommunication network.

If there is no match between the two mobile station number than an error sequence is generated by the processing server PS (step 6) and access to private data or services is rejected. In this case, either a error response message is sent back to the mobile station, or alternatively not any response message is sent back to the mobile station.

If there is a perfect match between the two mobile station number than the processing server PS performs the request for data or services asked by the user in the request message (step 7).

After the processing server obtains the requested information from either the private directory database DB, or the database/equipment D or the services node S, a response message is composed which includes the requested private data and send back to the user mobile station number (step 8) via the network N.

Depending of the request, either a SMS type message containing only text, or a EMS type message or a MMS type message containing image, video or graphics is sent back to the user.

The authentication method can be used for authenticated access to a range of private, or corporate data or services independently of the mobile station type and independently of the wireless telecommunication services provider. It is understood that a user/mobile station combination can access multiple data/services offered by different company or organization. In this case, the user/mobile station combination needs to be known from the different company or organization providing the data/services (i.e. at least the user mobile station number and user unique identifier needs to be stored in a corporate directory of each company or organization).

Figure 3:
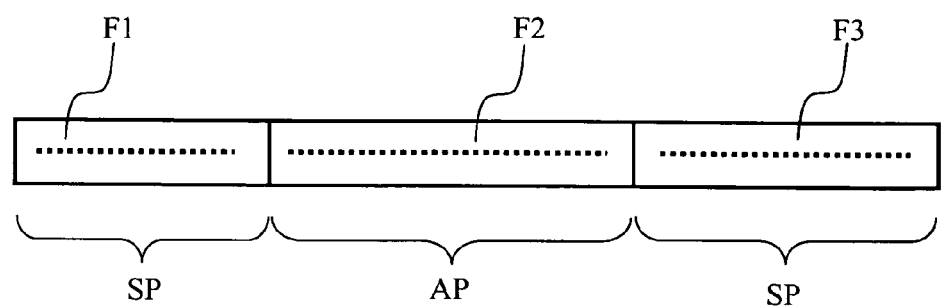
FIG. 3 illustrates the layout of a request message of the SMS type.

FIG. 3 illustrates a particular example of realization of the layout of a request message of the SMS type used by the method of the invention.

As described in ETSI standard TS 100 901 related to Technical realization of the Short Message Service (SMS) (GSM 03.40 version 7.4.0 Release 1998), a SMS type message can contain a maximum of 140 octets of data.

The SMS request message comprises three fields F1, F2 and F3. In this example, the fields F1 and F3 correspond to the service request part SP of the message, while the field F2 corresponds to the authentication part AP of the message.

The field F1 can be a keyword for the service required on the remote private server PI, for example a ldap directory look-up service.

The field F2 can be a keyword or a unique mobile station user identifier for the authentication of the mobile station user, for example a unique personal identifying alias of the ldap directory of the corporation.

The field F3 can be a command, an action or a look-up request for data or services, for example contact details to be retrieved for a specified name in the ldap directory of the corporation.

As an alternative, the field F1 can be omitted if a unique telephone number is assigned to each type of private service. This has also the advantage of simplifying the generation of the request message on the mobile station.

A first application using the method of authentication of the invention is the authentication of a user to query remotely a corporate ldap directory, namely to look up contact details of an employee in the company database.

As an example, a request message composed by the user Bob Jones for having contact details of a colleague Alice Smith would be:

"LDAP Bjones2 Alice Smith*"

LDAP being the keyword for directory look-up service (field F1,

Bjones2 being the alias or unique mobile station user identifier of Bob Jones in the corporate ldap directory (Field F2), and Alice Smith* being the name of the person for which contact details are needed. The star * representing a wild card.

As an example, the response message will show the result of the corporate ldap directory look-up:

"Contact details for Alice Smith-Cooper:

Tel: +23-4472-6468

Mobile: +23-6721-3234

Email: asmithcooper@corporation.com"

From the mobile station user perspective, the security is improved because the user knows the specific layout required to compose the request message and also its own unique identifier (alias).

From the private data or service provider, the security is improved because only a request message in the required layout with a matching unique mobile station user identifier/mobile station phone number combination can succeed the authentication checks.

Obviously, the request message is not limited to the particular layout described. The different fields F1, F2, F3, and the different parts AP, SP can be ordered and arranged differently. Nevertheless, it is necessary that both the user and the data/service provider use the same request message layout so that the service provider, in particular the processing server, is able to separate the authentication part from the service request part of the request message.

Also the content of the fields are not limited to what is described as an example. In particular, the user unique identifier is a data that identify the user uniquely. The user unique identifier can be the user alias, or any other uniquely identifying field allocated to this particular user in the ldap directory.

Advantageously, in order to further improve security, the request message and the response message can be ciphered by well known methods of the man skilled in the art which will not be describe (algorithms using symmetric or asymmetric keys).

A second application using the method of authentication of the invention is the authentication of a user to query technical or financial information on:

settings and status of remote system and equipment, namely temperature sensor, pressure sensor, valve, flow-rate sensor of an oil rig . . . etc;

value of particular company share on the stock exchange market, PER, income, debt . . . of a company . . . etc.

A third application using the method of authentication of the invention is the authentication of a user to remotely control a system or an equipment. In this case, the field F3 is a command like open, close, stop, start, adjust, set . . . etc, associated to an identification number of the system or equipment or part thereof to be controlled.

The invention claimed is:

1. Method for accessing private data or services from a mobile station over a public network including the step of authenticating a user of the mobile station for accessing to private data/services, comprising the steps of:

composing a text-based request message on the mobile station using a standard public text messaging protocol, said message including a request for private data, and sending said request message to a private server (MG, PS) offering the access to said private data/services, via the telephone network, checking the authenticity of the user of the mobile station based on the request message received by the server, if the authenticity of the user of the mobile station is confirmed, composing a text-based response message using a standard public text messaging protocol, the response message including the requested private data/services of the private server, and sending back to the mobile station said text-based response message, via the telephone network, wherein the request message additionally includes a user unique identifier, and is received by the private server with an appended user mobile station number, wherein the authenticity checking performed by the private server comprises the steps of:

checking whether the user unique identifier is stored in a private directory database, and checking whether the appended user mobile station number matches with the user mobile station number allocated to the user unique identifier stored in the private directory database;

and wherein, if the user authenticity is confirmed, an interaction between the private server and the mobile station is limited to the exchange of the text-based request message and the text-based response; and repeating the recited steps for any further interaction between the private server and the mobile station.

2. The method of claim 1, wherein the user unique identifier is a data related to the user of the mobile station, said data being stored in the private directory database.

3. The method of claim 2, wherein said data related to the user of the mobile station is the lightweight directory access protocol alias of the user.

4. The method according to claim 1, wherein the request message is a text message based on a Short Message System (SMS).

5. The method according to claim 1, wherein the request message is a Multimedia Message System (MMS) based message.

6. The method according claim 1, wherein the response message is a text message of the SMS based on a Short Message System (SMS).

7. The method according to claim 1, wherein the response message is a Multimedia Message System (MMS) based message.

8. The method according to claim 1, wherein the request message and the response message are ciphered.

9. The method according to claim 1, wherein the requested data are stored in a private directory database.

10. The method according to claim 1, wherein between public network and private network a gateway is installed, adapted to send and receive text-based messages and identifying the user mobile station number.

11. The method according to claim 1, wherein the request message includes a remote control command for equipment connected to the private network.

* * * * *